(12) United States Patent
Schmitt et al.

(10) Patent No.: US 9,745,698 B2
(45) Date of Patent: Aug. 29, 2017

(54) SENSOR ROLL

(71) Applicant: VOITH PATENT GMBH, Heidenheim (DE)

(72) Inventors: Matthias Schmitt, Munich (DE); Wolfgang Ecke, Jena (DE); Martin Breineder, Natschbach (AT)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 14/888,152

(22) PCT Filed: Apr. 23, 2014

(86) PCT No.: PCT/EP2014/058215
§ 371 (c)(1),
(2) Date: Jan. 25, 2016

(87) PCT Pub. No.: WO2014/177434
PCT Pub. Date: Nov. 6, 2014

(65) Prior Publication Data
US 2016/0160442 A1 Jun. 9, 2016

(30) Foreign Application Priority Data
Apr. 30, 2013 (DE) .................. 10 2013 207 889

(51) Int. Cl.
*D21F 3/08* (2006.01)
*D21G 1/00* (2006.01)
(Continued)

(52) U.S. Cl.
CPC ............. *D21G 1/0073* (2013.01); *D21F 3/08* (2013.01); *D21G 1/0046* (2013.01); *D21G 1/02* (2013.01);
(Continued)

(58) Field of Classification Search
CPC .... D21F 3/08; D21F 3/06; D21G 1/02; D21G 1/0046; D21G 1/0073; B65H 20/02; B65H 43/00
(Continued)

(56) References Cited

U.S. PATENT DOCUMENTS

| 5,383,371 A | 1/1995 | Laitinen |
| 5,562,027 A | 10/1996 | Moore |

(Continued)

FOREIGN PATENT DOCUMENTS

| DE | 10026883 C1 | 1/2002 |
| EP | 0538221 A2 | 4/1993 |

(Continued)

*Primary Examiner* — Mark Halpern
(74) *Attorney, Agent, or Firm* — Laurence A. Greenberg; Werner H. Stemer; Ralph E. Locher

(57) ABSTRACT

A roll for a machine for producing and/or processing a fibrous web, such as a paper, board or tissue web, has a circular-cylindrical main roll body. A roll cover covers the circumferential surface of the main roll body, at least in some segments. A pressure- and/or temperature-sensitive sensor is embedded in the roll cover. The sensor connects to an electrical and/or optical signal line. The signal line has a first line segment inside the roll. A second line segment extends substantially outside the roll and is connectable to a signal excitation and/or signal processing unit at one end. An electrical and/or optical rotational connection connects the first and second line segments to allow the line segments to be rotated relative to one another. When the roll is rotated, the first line segment rotates together with the main roll body. The second line segment does not have to follow the rotation.

15 Claims, 2 Drawing Sheets

(51) Int. Cl.
*D21G 1/02* (2006.01)
*G01L 5/00* (2006.01)
*G01L 5/10* (2006.01)

(52) U.S. Cl.
CPC .......... *D21G 1/0226* (2013.01); *G01L 5/0085* (2013.01); *G01L 5/107* (2013.01)

(58) Field of Classification Search
USPC .................................................. 162/198, 263
See application file for complete search history.

(56) References Cited

U.S. PATENT DOCUMENTS

| 9,302,871 B2* | 4/2016 | Breineder | D21F 3/06 |
| 2010/0324856 A1* | 12/2010 | Pak | D21F 3/06 702/138 |
| 2011/0226070 A1 | 9/2011 | Berendes et al. | |
| 2011/0301003 A1* | 12/2011 | Gustafson | D21F 3/06 492/10 |
| 2013/0345035 A1 | 12/2013 | Berendes et al. | |

FOREIGN PATENT DOCUMENTS

| WO | 2010034321 A1 | 4/2010 |
| WO | 2012113747 A1 | 8/2012 |

\* cited by examiner

SENSOR ROLL

This application is a 371 of PCT/EP2014/058215 filed on 23 Apr. 2014.

BACKGROUND OF THE INVENTION

Field of the Invention

The invention relates to a roll for a machine for producing and/or processing a fibrous web, in particular a paper, board or tissue web, comprising a circularly cylindrical main roll body, bearing journals arranged in the region of the two axial ends of the main body for rotatably supporting the roll about the longitudinal axis thereof on a frame of the machine, and a roll cover which covers the circumferential surface of the main roll body, at least in some segments, and in which there is embedded at least one pressure- and/or temperature-sensitive sensor, which can be connected to a signal excitation and/or signal processing unit by means of at least one electrical and/or optical signal line for the exchange of signals.

The invention further relates to a machine having a roll with at least one sensor embedded in the roll cover, and to a method for measuring pressure and/or temperature.

Rolls having sensors embedded in the roll cover for measuring pressure and/or temperature are used in web-processing machines to measure the profile in the nip in order to detect misalignments of the rolls in the nip and to be able to correct the same on this basis.

Such rolls are known from U.S. Pat. No. 5,562,027 or WO2010034321, for example.

The disadvantage with the aforementioned known rolls is that at least parts or components of their signal processing unit, including power supply and, if appropriate, signal excitation unit—this can comprise a light source, for example, in the case of optical sensors—are fixedly fitted to the rotating roll and therefore have to rotate with the latter. This is disadvantageous firstly since the co-rotating components have to be designed for high rotational speeds and secondly that the co-rotating components take up space which, in the restricted physical conditions of a roll, can often be accommodated only poorly or not at all, as can be the case, for example, in calender rolls. Thus, the components are often fitted to one of the roll caps of the roll in the space between roll cap and frame or roll mounting. A further disadvantage of components of the signal processing unit and/or signal excitation unit that are fixedly fitted to the roll and rotate with the latter is that said components have to be provided separately for each roll and therefore cannot be used for a plurality of rolls.

BRIEF SUMMARY OF THE INVENTION

The object of the present invention is, therefore, to propose a roll having sensors, a machine having such a roll and a method for operating such a roll in which the aforementioned disadvantages are no longer present.

The object is achieved by a roll having the features as claimed, by a machine having the features as claimed and by a method having the features as claimed.

The fact that the signal line comprises at least one first line segment extending substantially in the interior of the roll, which is connected to the at least one sensor at one end, furthermore at least one second line segment extending substantially outside the roll and connectable to the signal excitation and/or signal processing unit at one end, and an electrical and/or optical rotational connection, by means of which the first and second line segment are or can be connected to each other at the other ends thereof in such a way that said line segments can be rotated in relation to each other and in such a way that, when the roll is rotated about the longitudinal axis thereof, the first line segment rotates together with the main roll body, whereas the second line segment does not have to follow this rotational movement, means that the complete signal excitation and/or signal processing unit can be placed independently of the roll, i.e. arranged outside the rotating roll, and not connected to the latter in a rotationally fixed manner. Cable-free, for example WLAN, transmission of pre-processed data from the rotating roll which comprises part of the signal processing unit to components of the signal processing unit that are arranged independently of the roll is no longer necessary. Furthermore, an energy supply unit co-rotating with the roll, for example an inductive energy supply unit, is no longer necessary. Since the signal excitation and/or signal processing unit can be placed independently of the roll, the signal excitation and/or signal processing unit is accessible at any time for maintenance and/or commissioning work.

Furthermore, the space required by the roll according to the invention is reduced considerably, since no components of the signal excitation and/or signal processing unit are mounted on the cap thereof. The fact that, in addition, the roll is equipped without its own dedicated signal excitation and/or signal processing unit means that a single signal excitation and/or signal processing unit can be used for a plurality of rolls. This saves investment costs. Furthermore, a single signal excitation and/or signal processing unit can be used for the measurement of pressure and/or temperature of a plurality of rolls, for example within the context of measurements as a service.

If, in the context of the present invention, mention is made quite generally of the fact that the line segments, the rotational connection, the sensor or sensors and the signal excitation and/or signal evaluation unit are or can be connected to one another, then in the most general interpretation of this term, a connection of a functional type is to be understood which makes it possible to exchange signals between the sensor or sensors and the signal excitation and/or signal evaluation unit by means of the signal line, specifically independently of how the connection is produced in structural terms. Consequently, the term connection makes no restriction to the effect that, for example, the sensor or the sensors and the first line segment must be two components produced separately from each other which have subsequently been joined together. Instead, it is also conceivable that, for example, the sensor or the sensors and the first line segment are produced as a single component, as can be the case, for example, in fiber-optic sensors which are an integral constituent part of the optical fiber. Irrespective of this, however, it is also possible that the sensor or the sensors and the first line segment are two components produced separately from each other which have subsequently been joined together, as can be the case, for example, in piezoelectric sensors which are produced separately from the electrical signal line and are subsequently connected to the latter.

When, in the context of the present invention, mention is made of a signal excitation and/or signal processing unit, this does not necessarily have to mean that a signal excitation and signal processing unit are present. If both a signal excitation and signal processing unit are present, these do not necessarily have to form a single unit but can be units that are independent of one another, which are arranged in the same housing or in different housings. It is also conceivable that components of the signal excitation unit and of the signal evaluation unit are combined in a first housing and other components of the signal excitation unit and the signal evaluation unit are combined in a second housing.

Advantageous refinements and developments of the invention are specified in the sub claims.

According to a practical refinement of the invention, provision is made for the first line segment to extend substantially in the roll cover and/or in the interior of the circularly cylindrical main roll body and in particular to be rotationally fixedly connected to the roll cover and/or the main roll body (note: in this connection, rotationally fixedly means that in the event of rotation of the main roll body, the first line segment is carried along by the roll cover and/or the main roll body and therefore rotates together with the main roll body and the roll cover).

Preferably, the second line segment is or can be connected detachably or non-detachably to the rotational connection. An ability to make a detachable connection between the second line segment and rotational connection is conceivable, for example, when the one end of the second line segment is fixedly connected to the signal excitation and/or signal evaluation unit. An ability to make a non-detachable connection between the second line segment and rotational connection is conceivable, for example, when the one end of the second line segment is detachably connected to the signal excitation and/or signal evaluation unit. Of course, it is also conceivable that the second line segment is both detachably connected to the rotational connection and also detachably connected to the signal excitation and/or signal evaluation unit.

A detachable connection is to be understood to mean a connection which can be detached many times and produced again without destroying the connecting mechanism. A detachable connection can be produced, for example, by means of a plug-in connection, a clip-in connection, a screw connection. In this case, a standardized detachable connection, in which the connecting elements are standardized components, is preferably chosen here.

A non-detachable connection is to be understood to mean a connection which can be detached again only by destroying the connecting mechanism. A non-detachable connection can be produced, for example, by means of an adhesive connection, a splice connection (for example in the case of optical fibers) or a crimp connection (for example in the case of electric conductors such as copper cables).

According to a practical refinement of the invention, the rotational connection comprises a first and a second connecting piece, wherein the two connecting pieces are mounted on one another such that they can rotate relative to one another about an axis of rotation, and the first line segment is or can be connected to the first connecting piece at another end, and the second line segment is or can be connected to the second connecting piece at another end.

It is also conceivable that the second line segment can be connected detachably to the signal excitation and/or signal processing unit.

According to a further preferred refinement of the invention, provision is made for the rotational connection to be arranged on a bearing journal, in particular at the free front end of a bearing journal. In this case, it is in particular advantageous if the signal line is led out of the roll in the area of the rotational connection. According to a possible design refinement, this is possible, for example, in that the first connecting piece points into the interior of the roll and the second connecting piece points out of the roll or extends substantially outside the roll.

Preferably, provision is further made for the first connecting piece to be rotationally fixedly fastened to the bearing journal. In this connection, rotationally fixedly means that the first connecting piece cannot rotate relative to the bearing journal.

According to a further practical refinement of the invention, provision is made for the rotational connection to be arranged on the roll in such a way that the axis of rotation of the two connecting pieces and the axis of rotation of the roll coincide. In this connection, it is in particular conceivable that, by means of the longitudinal extent thereof and relative arrangement in relation to each other, the two connecting pieces jointly define a longitudinal axis of the rotational connection, which defines the axis of rotation of the two connecting pieces relative to each other and which coincides with the axis of rotation—this corresponds to the longitudinal axis—of the roll.

Various types of sensors which can be used in the roll according to the invention are possible.

According to a possible embodiment of the invention, provision is made that the at least one sensor is a piezoelectric sensor and the signal line is an electrical line.

In this connection, it is in particular conceivable that a plurality of first electrical line segments with a sensor respectively connected to one end are provided, each being connected to the first connecting piece at the other end. The rotary connector can in this case be an electric rotary connector, in particular a slip-ring transmitter.

According to an embodiment that is an alternative thereto, it is conceivable that the at least one sensor is an optical sensor, in particular a fiber-optic sensor, such as a fiber Bragg sensor, for example, and that the signal line is an optical fiber. In this connection, it is conceivable in particular that the first line segment is connected at one end to at least one sensor segment, which provides a plurality of fiber-optic sensors arranged one after another in series. In this case, the first line segment and the sensor segment can, for example, comprise a single component, i.e. be formed in one piece. It is also conceivable that the first line segment and the sensor segment comprise a plurality of mutually independent components, which are subsequently connected to one another.

Is also conceivable that a plurality of sensor segments connected to the first line segment are provided.

Furthermore, is it is conceivable that a plurality of sensor segments each having a plurality of sensors arranged one after another in series are provided. In the case in which the sensor or the sensors is or are optical sensors, the rotary connector can be an optical rotary connector, in particular a fiber-optic rotary connector. Fiber-optic rotary connectors suitable for the invention are offered, for example, by Princetel, Inc., Pennington, N.J. 08534.

The roll can in particular have a diameter of less than 850 mm, in particular a diameter in the range from 100 mm-800 mm. The inventive solution is preferably applied in such rolls, since said rolls were until now not suitable to be equipped with sensors because of their small diameters, since it was also impossible for components of the signal excitation and/or signal processing unit to be accommodated in the narrow space conditions predefined there.

According to a second aspect of the invention, a machine for producing and/or processing a fibrous web, in particular a paper, board or tissue web, with a roll according to the invention that can be rotated about the longitudinal axis thereof and with a signal excitation and/or signal processing unit connected to the roll via the signal line is placed under protection, being characterized in that the signal excitation and/or signal processing unit is not rotationally fixedly fastened to the roll—not even parts or components thereof—and therefore does not co-rotate with the roll during rotation of the roll about the longitudinal axis thereof.

This means that the signal excitation and/or signal processing unit is placed independently of the rotating roll and, for example, is fixed to the machine frame.

Preferably, the signal excitation and/or signal processing unit is a mobile signal generating and/or signal processing unit. In this connection, it is conceivable in particular that the signal generating and/or signal processing unit is a portable or mobile unit which, in order to carry out measurements, is brought to the respective sensor roll and connected to the latter.

In this connection, the signal excitation and/or signal processing unit can preferably be connected detachably to the second line segment.

If the at least one sensor is an optical sensor, then, according to a practical refinement, provision is preferably made that the signal excitation unit comprises a light source. Furthermore, provision can be made in this connection that the signal processing unit comprises a light receiver, in particular a spectrometer with polychromator and/or a data computer.

The roll preferably forms a nip with an opposing element, in particular an opposing roll.

A third aspect of the invention proposes a method for measuring pressure and/or temperature in a roll according to the invention, in which use is made of a mobile signal excitation and/or signal processing unit which, in order to carry out a measurement, is detachably connected to the roll by means of the second line segment and is separated from the roll again after the measurement has been carried out.

As a result of the provision of a signal excitation and/or signal processing unit that can be connected detachably to the roll, pressure and/or temperature measurements can be carried out on various sensor rolls with one and the same signal excitation and/or signal processing unit. In this way, investment costs for an expensive signal excitation and/or signal processing unit are saved. Furthermore, the pressure and/or temperature of a sensor roll can be measured with one and the same signal excitation and/or signal processing unit as part of a service for an extremely wide range of customers.

BRIEF DESCRIPTION OF THE SEVERAL VIEWS OF THE DRAWING

The invention will be explained further below by using schematic drawings, in which.

DESCRIPTION OF THE INVENTION

Figure 1:
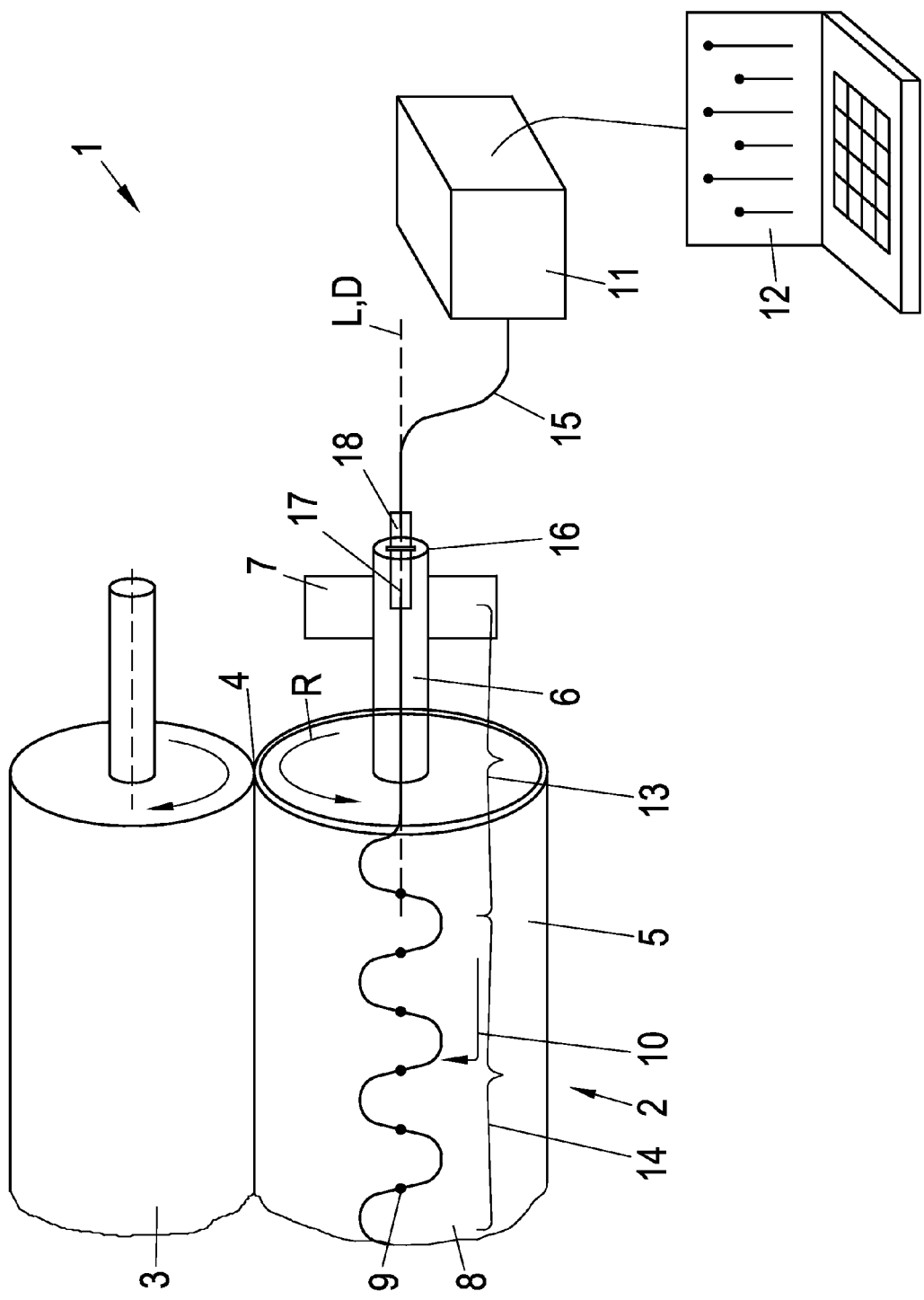
FIG. 1 shows an embodiment of a machine according to the invention having a roll according to the invention.

FIG. 1 shows an embodiment of a machine 1 according to the invention having a roll 2—called a sensor roll 2 below—which forms a nip 4 with an opposing roll 3.

The sensor roll 2 has a circularly cylindrical main roll body 5 and bearing journals 6 arranged in the area of the two axial ends of the main body 5, of which one bearing journal 6 can be seen in the present case, for the rotatable mounting of the sensor roll 2 about the longitudinal axis L thereof on a frame 7 of the machine.

The sensor roll 2 has a roll cover 8 substantially covering the circumferential surface of the main roll body 5 and in which a plurality of pressure-sensitive sensors 9 are embedded, being formed in the present case as fiber-optic sensors 9 in the form of fiber Bragg sensors.

The sensors 9 are detachably connected to a first signal excitation and signal processing unit 11 by means of a fiber optic signal line 10 in the form of an optical fiber for the exchange of signals. The first signal excitation and signal processing unit 11 is in turn connected to a second signal processing unit 12 by means of the signal line 10.

The signal line 10 comprises a first line segment 13 which extends in the interior of the sensor roll and is connected at one end to a sensor segment 14, which provides the plurality of fiber optic sensors 9 arranged one after another in series. Furthermore, the signal line 10 comprises a second line segment 15 extending outside the sensor roll 2 in the present case and detachably connected at one end to the first signal excitation and signal processing unit 11 and the second signal processing unit 12, and also an optical rotational connection 16, by means of which the first line segment 13 and the second line segment 15 are connected to each other at the other end such that they can be rotated in relation to each other in such a way that, during rotation R of the sensor roll 2 about the longitudinal axis L thereof, the first line segment 13 rotates together with the main roll body 5, whereas the second line segment 15 does not have to follow this rotational movement R.

In the present case, the second line segment 15 is detachably connected to the optical rotational connection 16 in the manner of a plug and/or screw connection.

As can be seen from the illustration of FIG. 1, the rotational connection 16 is arranged at the free front end of the bearing journal 6 and rotationally fixedly fastened to the latter. Furthermore, the first line segment 13 extends substantially in the roll cover 8.

Figure 2:
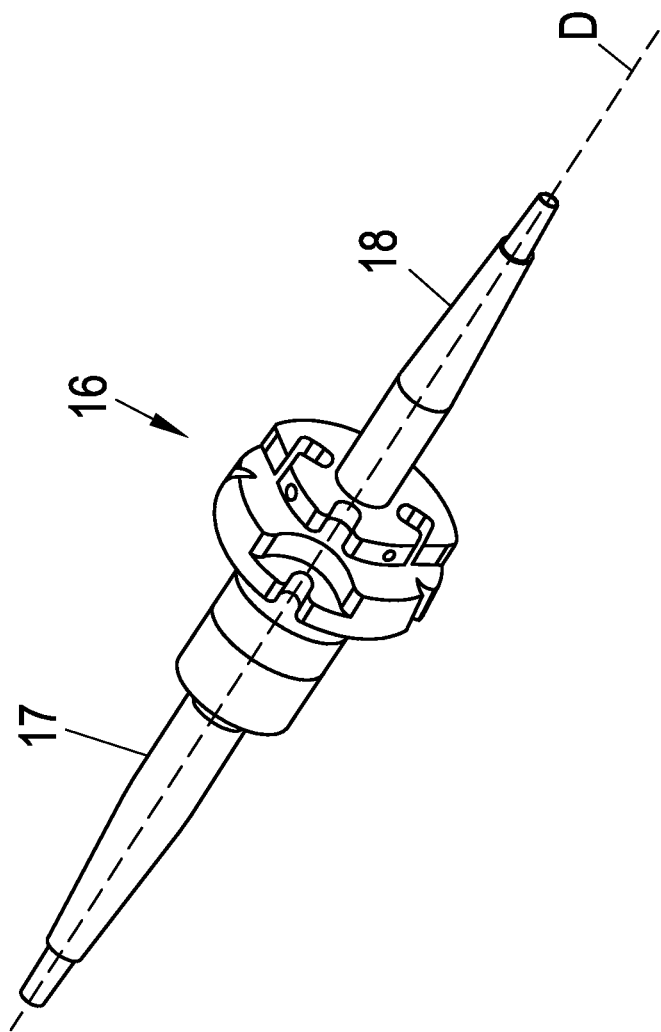
FIG. 2 shows an embodiment of a rotary connector used in the roll according to the invention.

As can be seen from FIG. 2, the rotational connection 16 comprises a first and a second connecting piece 17, 18, which are mounted on one another such that they can rotate relative to one another about an axis of rotation D, wherein the first line segment 13 is connected to the first connecting piece 17 at another end, and the second line segment 15 is connected to the second connecting piece 18 at another end. As can be seen, by means of the longitudinal extent thereof and relative arrangement in relation to each other, the two connecting pieces 17, 18 jointly define a longitudinal axis of the rotational connection, which defines the axis of rotation D of the two connecting pieces 17, 18 relative to each other.

In the present case, the first connecting piece 17 is rotationally fixedly fastened to the bearing journal 6, wherein the rotational connection 16 is arranged in such a way that the axis of rotation D of the two connecting pieces 17, 18 and the axis of rotation L of the sensor roll coincide.

The first signal excitation and signal processing unit 11 comprises a light source and a light receiver in the form of a spectrometer with polychromator and also a first data computer for pre-processing the signals from the sensors 9. The two units 11, 12 are connected one under another to each other, wherein the second signal processing unit 12 comprises a data computer for further processing the pre-processed signals and a monitor for the graphic display of the processed signals. The units 11, 12 are implemented as mobile units which, in order to carry out measurements on various sensor rolls, can be detachably connected to the latter and separated from the latter again after the measurements have been carried out.

The invention claimed is:

1. A roll for a machine for producing and/or processing a fibrous web, the roll comprising:
   a circular-cylindrical main roll body having a circumferential surface, a longitudinal axis and two axial ends;
   bearing journals arranged at said two axial ends of said main roll body for rotatably supporting said roll body about said longitudinal axis on a frame of the machine;
   a roll cover covering said circumferential surface of said main roll body at least in some segments thereof;
   at least one sensor selected from the group consisting of pressure sensors and temperature sensors;
   an electrical and/or optical signal line for signal exchange with a signal excitation and/or signal processing unit, said signal line including a first line segment extending substantially in an interior of said roll and having an end connected to said at least one sensor, a second line segment extending substantially outside said roll and having an end connectable to the signal excitation and/or signal processing unit; and
   an electrical and/or optical rotational connection for connecting said first and second line segments to one another and to allow said first and second line segments to rotate relative to one another so that, when the roll is rotated about said longitudinal axis, said first line segment rotates together with said main roll body, whereas said second line segment does not follow the rotational movement.

2. The roll according to claim 1, wherein said second line segment is detachably or non-detachably connected to said rotational connection.

3. The roll according to claim 1, wherein said rotational connection comprises a first connecting piece and a second connecting piece, said first and second connection pieces are mounted for rotation relative to one another about an axis of rotation, wherein said first line segment is connected or connectable to said first connecting piece at an end opposite said sensor, and said second line segment is connected or connectable to said second connecting piece at an end thereof opposite the end that is connected or connectable to the excitation and/or signal processing unit.

4. The roll according to claim 1, wherein said rotational connection is arranged on a free front end of bearing journal.

5. The roll according to claim 1, wherein said rotational connection is arranged on the roll such that an axis of rotation of said first and second connecting pieces coincides with the axis of rotation of the roll.

6. The roll according to claim 1, wherein said at least one sensor is a piezoelectric sensor and said signal line is an electrical line, and wherein said rotational connection is an electric rotary connector.

7. The roll according to claim 6, wherein said electric rotary connector is a slip-ring transmitter.

8. The roll according to claim 1, wherein said at least one sensor is an optical sensor, said signal line is an optical fiber, and said rotational connection is an optical rotary connector.

9. The roll according to claim 8, wherein said at least one sensor is a fiber Bragg sensor and said optical rotary connector is a fiber-optic rotary connector.

10. The roll according to claim 8, wherein said first line segment is connected at one end to at least one sensor segment which includes a plurality of fiber-optic sensors arranged one after another in series.

11. The roll according to claim 10, wherein said at least one sensor segment is one of a plurality of sensor segments.

12. The roll according to claim 1, wherein said first line segment of said signal line extends substantially in said roll cover and/or in an interior of said circular-cylindrical main roll body.

13. The roll according to claim 1, wherein said roll has a diameter of less than 850 mm.

14. The roll according to claim 13, wherein said roll has a diameter in a range from 100 mm to 800 mm.

15. A roll for a machine for producing and/or processing a fibrous web, the roll comprising:
   a circular-cylindrical main roll body having a circumferential surface, a longitudinal axis and two axial ends;
   bearing journals arranged at said two axial ends of said main roll body for rotatably supporting said roll body about said longitudinal axis on a frame of the machine;
   a roll cover covering said circumferential surface of said main roll body at least in some segments thereof;
   at least one sensor selected from the group consisting of pressure sensors and temperature sensors mounted in or on said roll cover;
   an electrical and/or optical signal line for signal exchange with a signal excitation and/or signal processing unit, said signal line including a first line segment extending substantially in an interior of said roll and having an end connected to said at least one sensor, a second line segment extending substantially outside the roll and remaining stationary relative to said roll when said roll rotates, and said second line segment having an end connectable to the signal excitation and/or signal processing unit; and
   an electrical and/or optical rotational connection for connecting said first and second line segments to one another, said rotational connection having a first connection piece fixedly mounted to said roll for rotation with said roll and with said first line segment, and said rotational connection having a stationary second connection piece fixedly connected to said second line segment, said rotational connection enabling a signal transmission between said sensor and the signal excitation and/or signal processing unit while said first connection piece rotates with the roll and said second connection piece remains stationary and does not rotate with the roll.

* * * * *